No. 832,522. PATENTED OCT. 2, 1906.
G. B. ANDERSON.
SKIMMER FOR MILK BOTTLES.
APPLICATION FILED DEC. 7, 1905.
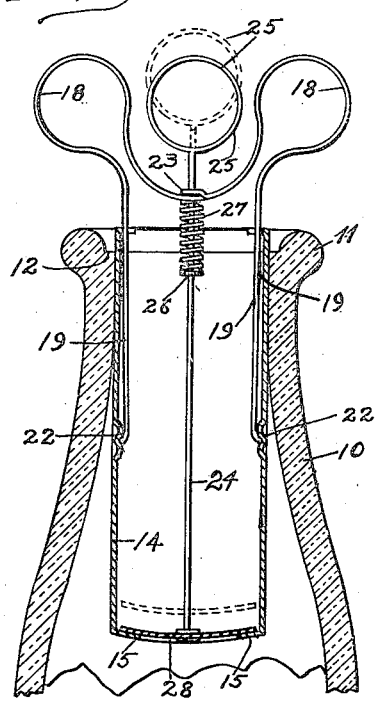
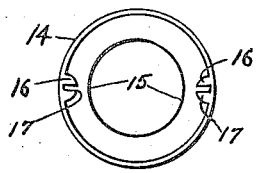
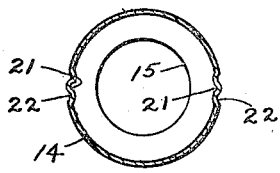
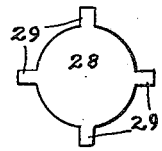
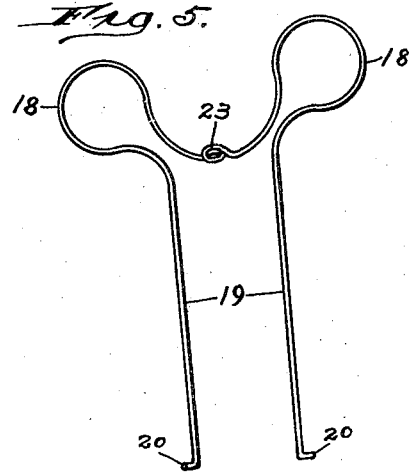
Witnesses:
Chas. E. Gorton
M. A. Nyman
Inventor:
Gustaf B. Anderson.
By Chas. C. Tillman
Atty

UNITED STATES PATENT OFFICE.

GUSTAF B. ANDERSON, OF CHICAGO, ILLINOIS.

SKIMMER FOR MILK-BOTTLES.

No. 832,522.　　　　Specification of Letters Patent.　　　　Patented Oct. 2, 1906.

Application filed December 7, 1905. Serial No. 290,692.

*To all whom it may concern:*

Be it known that I, GUSTAF B. ANDERSON, a citizen of the United States, residing at Chicago, in the county of Cook and State of Illinois, have invented certain new and useful Improvements in Skimmers for Milk-Bottles, of which the following is a specification.

This invention relates to improvements in means for skimming cream from milk contained in bottles such as are ordinarily used for the delivery of milk; and it consists in certain peculiarities of the construction, novel arrangement, and operation of the various parts thereof, as will be hereinafter more fully set forth and specifically claimed.

The principal object of the invention is to provide a handy, simple, inexpensive, and efficient skimming device which, while it is more especially intended to be used for skimming cream from milk contained in ordinary milk-bottles, yet it is applicable for skimming milk in other vessels.

Another object of the invention is to provide a device of the above-named character which may be manipulated by the use of one hand, thus permitting the other hand to be employed when desired to hold the vessel in which the cream is to be deposited.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a central vertical sectional view of a portion of a milk-bottle, showing a skimmer embodying my invention in place therein. Fig. 2 is a top plan view of the skimmer-tube. Fig. 3 is a plan sectional view thereof. Fig. 4 is a detached face view of the skimmer-valve, and Fig. 5 is a detached perspective view of the holder for the skimmer-tube and operating or valve rod.

Like numerals of reference refer to corresponding parts throughout the different views of the drawings.

The reference-numeral 10 designates a milk-bottle which, as usual, is surrounded at its mouth with an outwardly-projecting rim or bead 11 and has in its upper portion an annular recess 12 to receive a stopper which is in the form of a disk and may be made of cardboard or other suitable material. The skimmer consists of a tube or cylinder 14, which may be made of any suitable size, form, and material, but preferably of sheet metal and of a size to permit it to be easily inserted in the neck of the bottle or vessel in which the milk to be skimmed is contained. The lower end of the tube or cylinder 14 is open, but is provided with a horizontally inturned annular flange 15, as is clearly shown in Figs. 1 to 3, inclusive, of the drawings. The upper end of the tube 14 is provided with inturned lips 16, which are located diametrically opposite each other, and each of said lips is provided with an open slot 17 for the reception and operation of the vertical members of the skimmer-holder, which consists, by preference, of a single piece of wire bent to form two loops 18, which diverge from one another, and two parallel members 19, the lower end of each of which is formed with an outwardly-extending projection 20 to engage indentations or depressions 21 on the inner surface of the tube and about midway between its upper and lower ends. In order to prevent that portion of the metal in which the indentations 21 are formed projecting outwardly from the circle described by the tube or cylinder, an inwardly-extending depression 22 is formed around each of said indentations, as is clearly shown in Fig. 3 of the drawings. The wire comprising the holder is formed about midway between the loops 18 with a coil or loop 23, in which is located the valve or operating rod 24, the upper end of which is provided with a ring 25 for the reception of one of the fingers of the operator. The rod 24 is provided at a suitable point below the coil or loop 23 with a collar or projection 26, to which is secured one end of a spring 27, which is coiled around the rod and has its other end attached to or resting against the lower portion of said loop. Secured to the lower end of the rod 24 is a valve 28, used to close the opening in the lower end of the tube, and is provided with a series of radial projections 29 to rest on the flange 15 in the bottom of the tube and to act as guides for the valve.

As is clearly shown in Fig. 4, the projections 29 are spaced apart, so that when withdrawing the holder and valve from the tube for the purpose of cleaning the parts the valve may be turned so as to stride the lips 16 on the upper portion of the tube or cylinder. To place the holder in position in the tube, the members 19 are pressed toward each other, when they, as well as the valve and its rod, may be inserted in the tube until the projections 20 on the lower ends of the members reach the depressions 21, when the pressure may be removed from said members, thus allowing the projections 20 thereon to engage the said depressions or indentations, while the upper portions of the members 19 will rest in the slots 17 of the lips 16, which slots will afford retaining means for the upper portion of the holder. The spring 27 will normally actuate the rod 24, so as to press the valve 28 against the flange 15 of the tube, thus closing the opening in its lower end; but when it is desired to skim the milk or remove the cream therefrom the valve may be raised to about the position shown by dotted lines in Fig. 1, thus permitting the cream to enter the tube and pass through the spaces between the projections 29 on the valve and the wall of the tube, after which the valve will be closed by means of the spring 27 on the operating-rod. By forming the holder with the loops 18 it is apparent that the first and third fingers of the hand of the operator may be inserted in said loops, while the second or middle finger may be inserted in the ring 25 on the operating-rod for raising the valve. From the above description it is apparent that the tube when the holder is in engagement therewith may be removed from the vessel and the cream deposited in another receptacle and also that the parts may be easily separated, so that the device may be thoroughly cleansed.

Having thus fully described my invention, what I claim as new, and desire to secure by Letters Patent, is—

1. The combination with a tube having at its lower end an inturned annular flange and provided internally between its ends with indentations, of a holder having yielding prongs and a pair of loops, the said prongs extending into the tube and having projections to engage said indentations, a spring-actuated valve-rod mounted on the holder between its loops, and a valve on the lower portion of said rod to rest on the flange of the tube and to close the opening therein, substantially as described.

2. The combination with a tube having at its lower end an inturned annular flange and provided internally between its ends with diametrically-disposed indentations, of a holder consisting of two parallel members having spaced-apart yielding loops and provided between said loops with an intermediate loop, the said members extending into the tube and having projections to engage the indentations therein, a spring-actuated valve-rod movably located in the intermediate loop of the holder, and a valve on the lower portion of said rod to rest on the flange of the tube and close the opening therein, substantially as described.

GUSTAF B. ANDERSON.

Witnesses:
CHAS. C. TILLMAN,
M. A. NYMAN.